(No Model.)

C. F. PEASE.
PNEUMATIC TIRE.

No. 508,746. Patented Nov. 14, 1893.

Witnesses:
Sew. E. Curtis
H. W. Munday.

Inventor:
Charles F. Pease.
By Munday, Evarts & Adcock,
His Attorneys.

UNITED STATES PATENT OFFICE.

CHARLES F. PEASE, OF CHICAGO, ILLINOIS, ASSIGNOR TO THE DERBY CYCLE COMPANY, OF SAME PLACE.

PNEUMATIC TIRE.

SPECIFICATION forming part of Letters Patent No. 508,746, dated November 14, 1893.

Application filed April 12, 1893. Serial No. 470,130. (No model.)

*To all whom it may concern:*

Be it known that I, CHARLES F. PEASE, a citizen of the United States, residing in Chicago, in the county of Cook and State of Illinois, have invented a new and useful Improvement in Pneumatic Tires, of which the following is a specification.

This invention relates to the method of mechanically securing pneumatic tires upon bicycle wheels.

The nature of the improvement consists in the combination with the wheel rim upon the edges whereof are annular shoulders facing the vertical center of the wheel, of an inflatable core and a flexible sheath therefor, the latter being provided with an annular shoulder along each side adapted to abut against the annular shoulders of the rim and hold the sheath against the expanding power of the core, the countering shoulders being held together by the inward pressure of the core.

The invention further consists in the combination of such a rim, core, and sheath, when the edges of the latter are extended toward each other and over the hollow of the rim, whereby the core is prevented from coming in contact with the metal of the rim, and the pressure created by inflating the core is also rendered more effective in maintaining the shoulders of the sheath in proper bearing position against the shoulders of the rim.

All these features of invention are fully disclosed below, and shown in the accompanying drawings, wherein—

Figure 1:
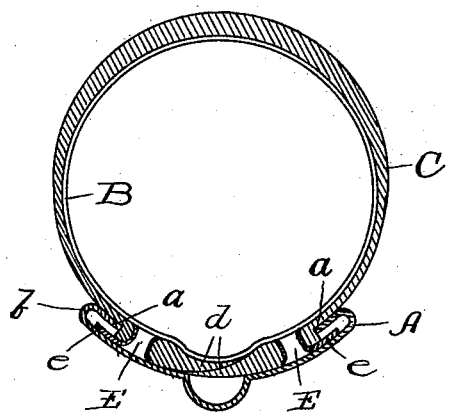
Figure 2:
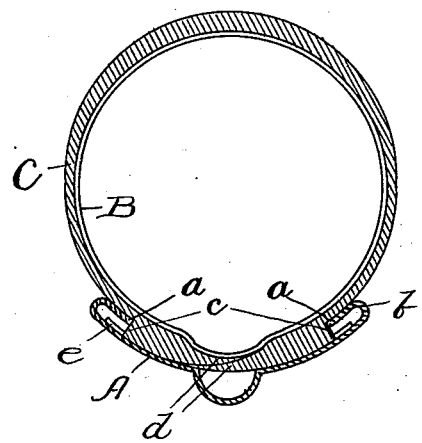
Figure 3:
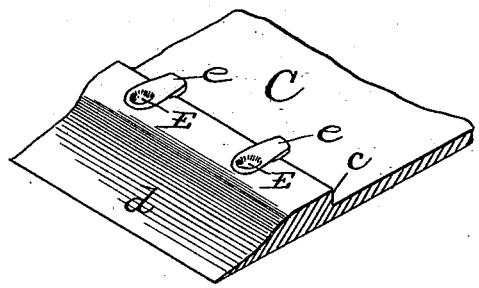

Figures 1 and 2 are transverse sections of the wheel rim and the tire, taken in different planes. Fig. 3 is a perspective of a portion of the tire sheath.

In the drawings A represents the rim of the wheel, the side portions of which are each fashioned so as to form an annular shoulder $a$. This is most easily and cheaply done by bending the metal of the rim over upon itself in hook-form, as plainly indicated at $b$ in the drawings, the open side of the hooks being toward the central plane of the wheel, so that the edges of the metal form the shoulders $a$.

B is the inflatable tube forming the core of the tire, and C is the flexible protecting sheath encircling the tube and serving as the medium for attaching it to the rim. Each side of the sheath is provided with an annular shoulder $c$ upon the outer surface, which is best formed perhaps by thickening the sheath at those points. The shoulders should be abrupt upon one side, so that they will abut against the edges or shoulders $a$ upon the rim, and thus enable the sheath to resist the tendency of the core to force the sheath edges apart; and while the shoulders upon the two parts thus engage and enable the sheath to retain the core within its embrace, the core is at the same time pressing the sides of the sheath forcibly down upon the rim, so that the engagement between the shoulders $a$ and $c$ remain constant. For the purpose of increasing the security with which this engagement is maintained, I extend the meeting edges $d\,d$ of the sheath so that they cover the central or hollow portion of the rim, and preferably so that such edges may overlap each other as shown. These edges are firmly pressed in upon the rim by the action of the core, and they not only act as stated but also prevent contact by the core with the metal of the rim.

In putting the tires on the wheels, some means should be provided for holding the sheath temporarily and prior to the inflating of the core, because, until the inflation has taken place there is nothing to keep the shoulders $a$ and $c$ in engagement. For this purpose I apply to the sheath at intervals throughout its length, and in proximity to the shoulders $c$, guards which are preferably in the form of the lacing hooks, buttons or studs used upon shoes. These guards have each a tubular or eyelet portion E which is readily pressed into and clinched upon the thickened portions of the sheath, and a laterally projecting point $e$ which overhangs the shoulder $c$ as shown. By means of the eyelets thus clinched upon the shouldered portion of the sheath, the shoulder is much strengthened, and rendered capable of withstanding a greater strain than the shoulder not thus aided by metal can bear. The shoulder is also prevented by the eyelets from splitting or chipping off. The overhanging points $e$ enter under the hooks of the rim, and thus act as guards to retain the sheath in position prior to the inflation, but they cease thus to act as soon as the inflation has taken place, because the inward pressure by the core then forces the points e toward the axis and prevents contact between them and the rim edges. The points e remain permanently and normally under the hook edges however, so that should anything occur to lift the sheath from the rim the hooks will then act as safeguards to prevent its getting off or out of position.

I claim—

1. The combination with the wheel rim, the edges whereof are bent over to form hooks which open toward the vertical center of the wheel, of an inflatable core and a flexible sheath therefor, the latter being provided with an annular shoulder along each side adapted to abut against the edge of the bent over portions of the rim, and said sheath being also provided with metallic guards adapted to set under said bent over portions of the rim, substantially as specified.

2. The combination of the wheel rim having the annular shoulders at each side, with an inflatable tube and a flexible sheath therefor, the latter having shoulders which are adapted to engage the shoulders of the rim, and also having metallic guards consisting of the eyelets E passing through the shouldered portions of the sheath and projecting guards e overhanging said portions, substantially as specified.

3. The combination with the wheel rim, the edges whereof are bent over to form hooks which open toward the vertical center of the wheel, of an inflatable core and a flexible sheath therefor, the latter being provided with an annular shoulder along each side adapted to abut against the edge of the bent over portions of the rim, and said sheath being also provided with metallic guards adapted to set under said bent over portions of the rim, and with edges extended so as to overlap each other above the hollow of the rim, substantially as specified.

CHARLES F. PEASE.

Witnesses:
H. M. MUNDAY,
EMMA HACK.